(12) United States Patent
Forbes et al.

(10) Patent No.: US 11,711,994 B2
(45) Date of Patent: Aug. 1, 2023

(54) SYSTEM AND METHOD FOR MONITORING THE CONDITION OF A LATERAL SWATH OF A SEEDBED WITH A SEEDBED FLOOR DETECTION ASSEMBLY

(71) Applicant: CNH Industrial Canada, Ltd., Saskatoon (CA)

(72) Inventors: Alan Forbes, Waterford, WI (US); James W. Henry, Saskatoon (CA); Robert A. Zemenchik, Kenosha, WI (US)

(73) Assignee: CNH Industrial Canada, Ltd., Saskatoon (CA)

( * ) Notice: Subject to any disclaimer, the term of this patent is extended or adjusted under 35 U.S.C. 154(b) by 608 days.

(21) Appl. No.: 16/369,131

(22) Filed: Mar. 29, 2019

(65) Prior Publication Data
US 2020/0305334 A1  Oct. 1, 2020

(51) Int. Cl.
A01B 63/24 (2006.01)
A01B 5/04 (2006.01)
A01B 63/00 (2006.01)
A01B 49/02 (2006.01)

(52) U.S. Cl.
CPC .............. *A01B 63/245* (2013.01); *A01B 5/04* (2013.01); *A01B 63/004* (2013.01); *A01B 49/027* (2013.01)

(58) Field of Classification Search
CPC ....... A01B 63/245; A01B 63/004; A01B 5/04; A01B 49/027
See application file for complete search history.

(56) References Cited

U.S. PATENT DOCUMENTS

| | | |
|---|---|---|
| 5,240,079 A | 8/1993 | Schmidt |
| 6,553,925 B1 | 4/2003 | Beaujot |
| 7,147,241 B2 | 12/2006 | Beaujot et al. |
| 7,756,624 B2 | 7/2010 | Diekhans et al. |
| 7,908,084 B2 | 3/2011 | Anderegg et al. |
| 8,047,301 B2 | 11/2011 | Friggstad et al. |
| 9,565,802 B2 | 2/2017 | Schleicher |
| 9,868,438 B2 | 1/2018 | Jung et al. |
| 2013/0180742 A1* | 7/2013 | Wendte et al. .... A01B 63/1145 172/4 |
| 2018/0139892 A1 | 5/2018 | Knobloch et al. |
| 2018/0220577 A1 | 8/2018 | Posselius et al. |

(Continued)

FOREIGN PATENT DOCUMENTS

EP    3300559    4/2018

*Primary Examiner* — Tara Mayo
(74) *Attorney, Agent, or Firm* — Rebecca L. Henkel; Rickard K. DeMille

(57) ABSTRACT

In one aspect, a system for monitoring the condition of a seedbed within a field may include a seedbed tool configured to ride along a seedbed floor as an implement frame is moved across the field. The system may also include an actuator configured to adjust the position of the seedbed tool along a lateral direction relative to the implement frame such that the seedbed tool traverses a lateral swath of the seedbed floor along the lateral direction. Furthermore, the system may include a seedbed floor sensor configured to detect the position of the seedbed tool relative to the implement frame. The position of the seedbed tool may be indicative of a profile of the lateral swath of the seedbed floor as the seedbed tool rides along the seedbed floor with movement of the implement frame in the forward travel direction.

19 Claims, 7 Drawing Sheets

(56) References Cited

U.S. PATENT DOCUMENTS

2018/0279542 A1    10/2018  Kovach
2018/0325020 A1*   11/2018  Connell ................ A01B 79/02
2018/0325021 A1*   11/2018  Connell et al. ........ A01C 7/102

* cited by examiner

SYSTEM AND METHOD FOR MONITORING THE CONDITION OF A LATERAL SWATH OF A SEEDBED WITH A SEEDBED FLOOR DETECTION ASSEMBLY

FIELD OF THE INVENTION

The present disclosure generally relates to systems and methods for monitoring the condition of a seedbed within a field when performing field operations (e.g., tillage operations) and, more particularly, to systems and methods for determining a profile(s) of a lateral swath of the seedbed floor created or traversed across by an agricultural implement during the performance of a field operation.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is desirable to create a level and uniform layer of tilled soil across the field to form a proper seedbed for subsequent planting operations. However, due to varying soil conditions across the field and/or other factors, the levelness and/or uniformity of the seedbed may be impacted significantly. Such poor seedbed conditions can result in a subsequent loss in the crop yield, such as due to poor germination and/or non-uniform plant stands. In this regard, systems to monitor the condition of the seedbed created during a tillage operation have been developed. However, further improvements to such systems are needed.

Accordingly, an improved system for monitoring seedbed conditions would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring the condition of a seedbed within a field. The system may include an implement frame extending along a lateral direction between a first side and a second side. The system may also include a seedbed tool configured to ride along a seedbed floor as the implement frame is moved across the field in a forward travel direction of the implement frame, with the seedbed extending downwardly within the field from an outer seedbed surface to the seedbed floor. Furthermore, the system may also include an actuator configured to adjust the position of the seedbed tool along the lateral direction relative to the implement frame as the implement frame is moved across the field in the forward direction of travel such that the seedbed tool traverses a lateral swath of the seedbed floor along the lateral direction. Additionally, the system may include a seedbed floor sensor configured to detect the position of the seedbed tool relative to the implement frame. The position of the seedbed tool may be indicative of a profile of the lateral swath of the seedbed floor as the seedbed tool rides along the seedbed floor with movement of the implement frame in the forward travel direction.

In another aspect, the present subject matter is directed to an agricultural implement. The agricultural implement may include a frame extending along a lateral direction between a first side and a second side. Furthermore, the agricultural implement may include a seedbed tool configured to ride along a seedbed floor as the agricultural implement is moved across a field in a forward travel direction of the agricultural implement, with the seedbed extending downwardly within the field from an outer seedbed surface to the seedbed floor. Furthermore, the agricultural implement may include an actuator configured to adjust the position of the seedbed tool along the lateral direction relative to the frame as the agricultural implement is moved across the field in the forward direction of travel such that the seedbed tool traverses a lateral swath of the seedbed floor along the lateral direction. Additionally, the agricultural implement may include a seedbed floor sensor configured to detect position of the seedbed tool relative to the frame. The position of the seedbed tool is indicative of a profile of the lateral swath of the seedbed floor as the seedbed tool rides along the seedbed floor with movement of the agricultural implement in the forward travel direction.

In a further aspect, the present subject matter is directed to a method for monitoring the condition of a seedbed within a field being traversed by an agricultural implement. The agricultural implement may include a frame and a seedbed tool configured to ride along a seedbed floor as the agricultural implement is moved across the field in a forward travel direction. The method may include controlling, with a computing device, an operation of an actuator such that the seedbed tool traverses a lateral swath of the seedbed floor along a lateral direction of the agricultural implement as the agricultural implement is moved across the field in the forward direction of travel. The method may include receiving, with the computing device, seedbed floor data indicative of a position of the seedbed tool relative to the frame, with the position of the seedbed tool being indicative of a profile of the lateral swath of the seedbed floor. Furthermore, the method may include determining, with the computing device, the profile of the lateral swath of the seedbed floor based on the received seedbed floor data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
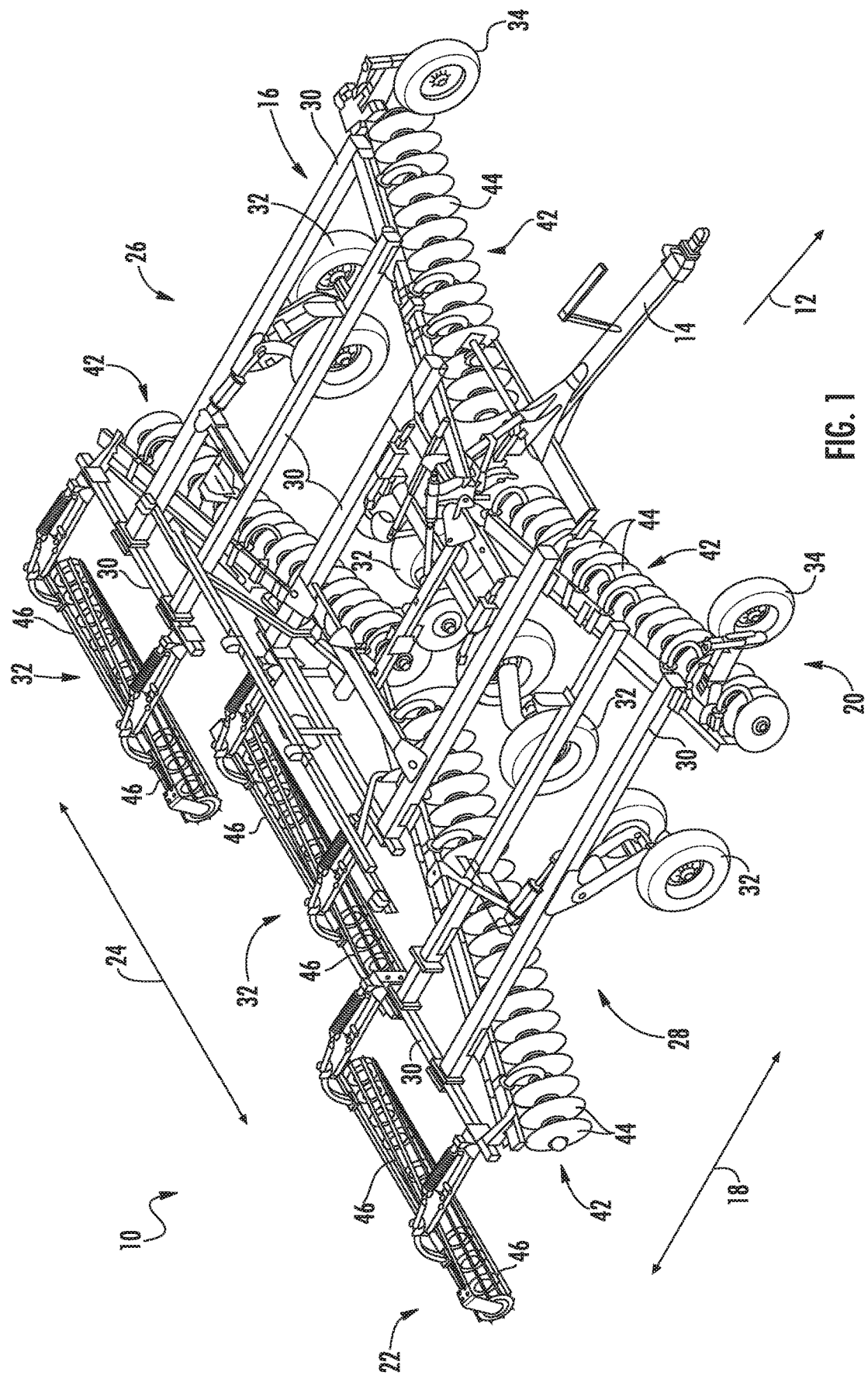
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the condition of a seedbed created during the performance of a field operation, such as a tillage operation. Specifically, in several embodiments, one or more seedbed floor detection assemblies may be coupled to a frame of an agricultural implement aft of a plurality of ground-penetrating tools (e.g., disc blades) mounted adjacent to the frame. One or more actuators may be configured to adjust the position of the seedbed floor detection assembly(ies) relative to a frame of the implement in a lateral direction of the implement, with the lateral direction extending perpendicular to the forward direction of travel of implement. In this regard, as the implement traverses a field in the direction of travel, the seedbed floor detection assembly(ies) are moved in the lateral direction (e.g., back and forth in the lateral direction) such that the detection assembly(ies) traverses a lateral swath(s) of the seedbed floor. As such, the seedbed floor detection assembly(ies) may be used to monitor the condition(s) of the lateral swath(s) of the seedbed behind the ground-penetrating tools. For instance, the seedbed floor detection assembly(ies) may be configured to detect a vertical profile(s) of the lateral swath(s) of the seedbed floor as the implement is moved across the field. Based on the detected profile(s), a controller of the system may be configured to initiate one or more control actions (e.g., adjusting an operating parameter(s) of the implement or an associated work vehicle) to account for the profile(s), thereby allowing a more uniform and level seedbed to be created as the field operation is being performed.

The present subject matter will generally be described herein in the context of monitoring seedbed conditions when performing a tillage operation using a tillage implement, such as a disc harrow. However, it should be appreciated that the disclosed system and method may also be used to monitor seedbed conditions within a field when performing any other suitable type of field operation, such as fertilizing, planting, and/or the like. Additionally, it should be appreciated that the disclosed system components may be provided in operative association with any suitable agricultural implement configured to perform a field operation, such as cultivators, disk harrows, planters, fertilizers, chisels, and/or the like.

Figure 2:
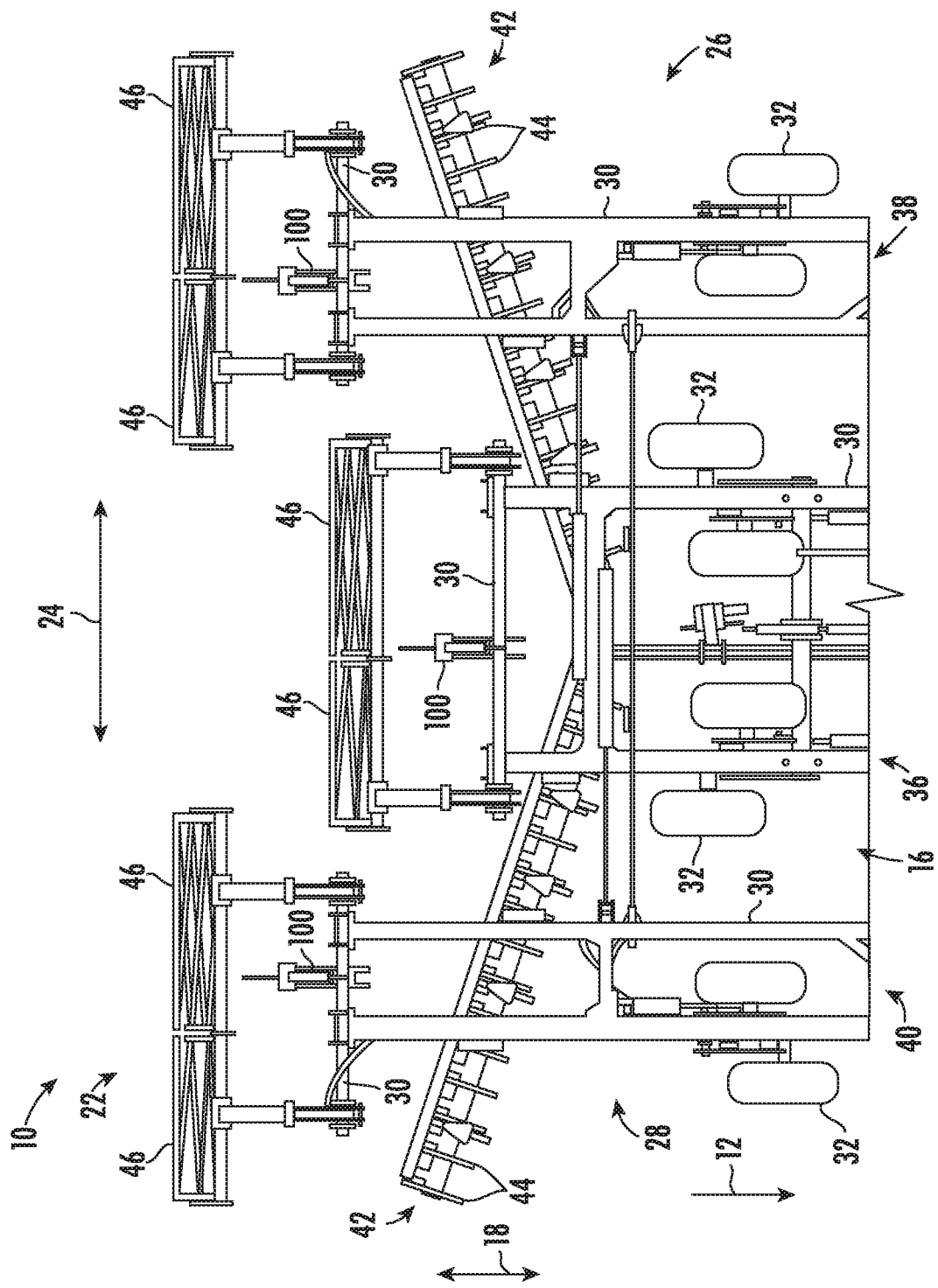
FIG. 2 illustrates a partial top view of the agricultural implement shown in FIG. 1, particularly illustrating a plurality of seedbed floor detection assemblies mounted on the implement.

Referring now to the drawings, FIGS. 1 and 2 illustrate differing views of one embodiment of an agricultural implement 10 in accordance with aspects of the present subject matter. Specifically, FIG. 1 illustrates a perspective view of the agricultural implement 10, particularly illustrating various components of the implement 10. Additionally, FIG. 2 illustrates a partial top view of the implement 10, particularly illustrating a plurality of seedbed floor detection assemblies 100 mounted on the implement 10.

In general, the implement 10 may be configured to be towed along a forward direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components. For example, a plurality of wheel assemblies may be coupled to the frame 16, such as a plurality of centrally located wheels 32 and a plurality of front pivoting wheels 34, to facilitate towing the implement 10 in the direction of travel 12.

In several embodiments, the frame 16 may include one or more sections. For example, as shown, in the illustrated embodiment, the frame 16 may include a main or center section 36 positioned centrally between the first and second sides 26, 28 of the frame 16. The frame 16 may also include a first wing section 38 positioned adjacent to the first side 26 of the frame 16. Similarly, the frame 16 may also include a second wing section 46 positioned adjacent to the second side 28 of the frame 16. The first and second wing sections 38, 40 may be pivotably coupled to the main section 36 of the frame 16. In this respect, the first and second wing sections 38, 40 may be configured to fold up relative to the main section 36 to reduce the lateral width of the implement 10 to permit, for example, storage or transportation of the implement 10 on a road. However, in other embodiments, the frame 16 may include any suitable number of frame sections.

Referring still to FIGS. 1 and 2, the implement 10 may also include a plurality of ground-penetrating tools supported by the frame 16, such as discs, sweeps, tines, rotary tools, and/or other ground-engaging components commonly used in soil management. In general, the ground-penetrating tools may be configured to create or be moved through a seedbed extending downwardly within the field across which the implement 10 is traveling. For example, in one embodiment, the frame 16 may be configured to support one or more gangs or sets 42 of disc blades 44 at its forward end 20. In such an embodiment, each disc blade 44 may, for example, include both a concave side (not shown) and a convex side (not shown). In addition, the gangs 42 of disc blades 44 may be oriented at an angle relative to the travel direction 12 to promote more effective tilling of the soil. In this regard, and as will be described below, each disc blade 44 may define a width in the lateral direction 24 extending between its leading edge (not shown) and its trailing edge (not shown). Although the illustrated embodiment of the implement 10 includes four gangs 42 of disc blades 44, it should be appreciated that, in alternative embodiments, the implement 10 may include any other suitable number of gangs 42 of disc blades 44.

It should be appreciated that, in addition to the gangs 42 of disc blades 44 shown in FIGS. 1 and 2 (or as an alternative thereto), the implement 10 may include any other suitable ground-penetrating tools. For instance, if the implement 10 is configured as a cultivator or ripper, the implement 10 may include a plurality of rows or ranks of ground-penetrating shanks. Similarly, if the implement 10 is configured as a planter, the implement 10 may include a plurality of opener discs and/or closer discs.

Additionally, the implement 10 may also include a plurality of surface-finishing tools supported by the frame 16. In general, the surface-finishing tools to may be configured to be moved along an outer surface of the soil in a manner that conditions of the outer soil surface. As such, in several embodiments, the surface-finishing tools may be positioned behind or aft of the ground-penetrating tools relative to the direction of travel 12 of the implement 10. For example, in one embodiment, the frame 16 may be configured to support one or more baskets or rotary firming wheels 46 adjacent to its aft end 20. The baskets 46 may, in turn, be configured to reduce the number of clods in the soil and/or firm the soil over which the implement 10 travels. In the illustrated embodiment, a pair of baskets 46 is coupled to each section 36, 38, 40 of the frame 16. However, in alternative embodiments, each section 36, 38, 40 may be include any other suitable number of baskets 46, such as a single basket 46 or three or more baskets 46. Furthermore, although the illustrated embodiment of the implement 10 includes a total of six baskets 46, it should be appreciated that, in alternative embodiments, the implement 10 may include any other suitable number of baskets 46.

Moreover, it should be appreciated that, in addition to the baskets 46 shown in FIGS. 1 and 2 (or as an alternative thereto), the implement 10 may include any other suitable surface-finishing tools. For instance, if the implement 10 is configured as a cultivator, the implement 10 include a plurality of rows harrow tines and/or leveling blades. Similarly, if the implement 10 is configured as a planter, the implement 10 may include a plurality of packer wheels.

Referring particularly to FIG. 2, the implement 10 may include one or more seedbed floor detection assemblies 100 mounted on its frame 16. In general, and as will be described below, each detection assembly 100 may be configured to capture data indicative of the vertical profile of a lateral swath of the seedbed floor of the field across which the implement 10 is traveling. As shown, in the illustrated embodiment, one detection assembly 100 is coupled to each section 36, 38, 40 of the frame 16. However, in alternative embodiments, each section 36, 38, 40 may include more than one detection assembly 100, such as two or more detection assemblies 100. Furthermore, in other embodiments, one or more of the sections 36, 38, 40 may not include any detection assemblies 100. In this regard, the implement 10 may include any other suitable number of detection assemblies 100 mounted on the frame 16, such as one, two, or four more detection assemblies 100.

In several embodiments, each detection assembly 100 may be positioned aft of the ground-penetrating tools of the implement 10 and forward of the surface-finishing tools of the implement 10 relative to the direction of travel 12. Specifically, in such embodiments, each detection assembly 100 may be positioned aft of the ground-penetrating tools and forward of the surface-finishing tools that are positioned on the same section of the frame 16. For example, as shown in FIG. 2, the detection assembly 100 coupled to the center section 36 of the frame 16 may be positioned aft of the disc blades 44 mounted on the center section 36 and forward of the basket 46 mounted on the center section 36. Similarly, the detection assemblies 100 coupled to the wing sections 38, 40 of the frame 16 may be positioned aft of the disc blades 44 mounted on the such sections 38, 40 and forward of the baskets 46 mounted on such sections 38, 40. Additionally, in one embodiment, the detection assemblies 100 coupled to the wing sections 38, 40 may be aligned with each other along the longitudinal direction 18. However, in alternative embodiments, each detection assembly 100 may be positioned aft of all the ground-penetrating tools and forward of all the surface-finishing tools. Furthermore, in other embodiments, each detection assembly 100 may be positioned aft of the ground-penetrating tools and the surface-finishing tools, such as on an auxiliary support beam (not shown) extending rearwardly from the aft end 20 on the frame 16.

Additionally, it should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
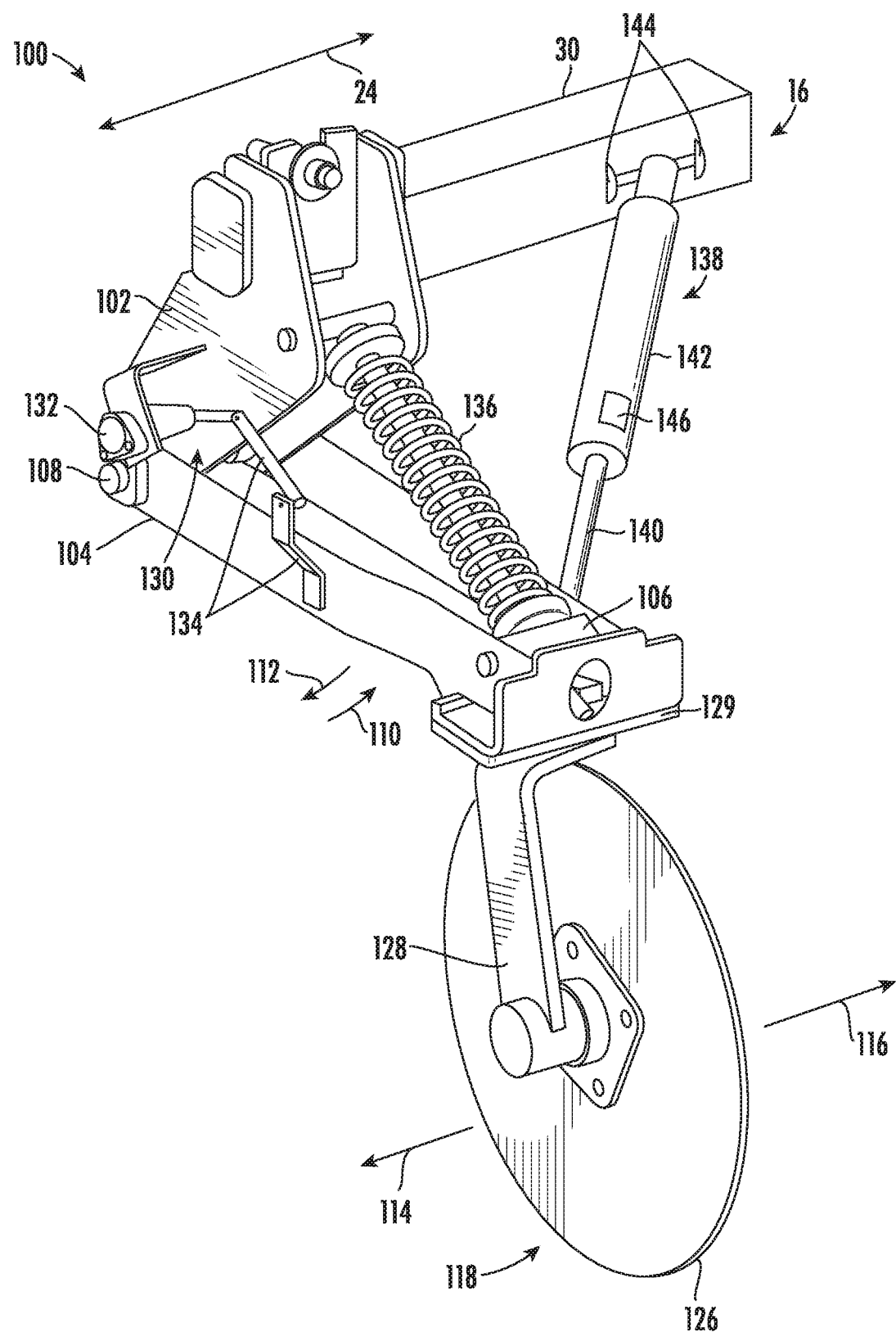
FIG. 3 illustrates a perspective view of one embodiment of a seedbed floor detection assembly in accordance with aspects of the present subject matter.

Referring now to FIG. 3, a perspective view of one embodiment of a seedbed floor detection assembly 100 for use with an agricultural implement is illustrated in accordance with aspects of the present subject matter. In general, the seedbed floor detection assembly 100 will be described herein with reference to the implement 10 described above with reference to FIGS. 1 and 2. However, it should be appreciated by those of ordinary skill in the art that the disclosed seedbed floor detection assembly 100 may generally be utilized with implements having any other suitable implement configuration.

As shown in FIG. 3, the detection assembly 100 may be supported by a portion of the frame 16, such as by coupling the detection assembly 100 to one of the frame members 30 via a bracket 102. In several embodiments, the detection assembly 100 may include one or more pivot arms (e.g., a first pivot arm 104 and a second pivot arm 106) pivotably coupled to the frame member 30 (e.g., via the bracket 102) such that the pivot arms 104, 106 are configured to pivot relative to the frame member 30. For instance, the pivot arms 104, 106 may be pivotably coupled to the frame member 30 at pivot joints 108 defined between the pivot arms 104, 106 and the mounting bracket 102. As such, the pivot arms 104, 106 may pivot relative to the frame member 30 about the joints 108 vertically (e.g., as indicated by arrows 110, 112 in FIG. 3).

Figure 4:
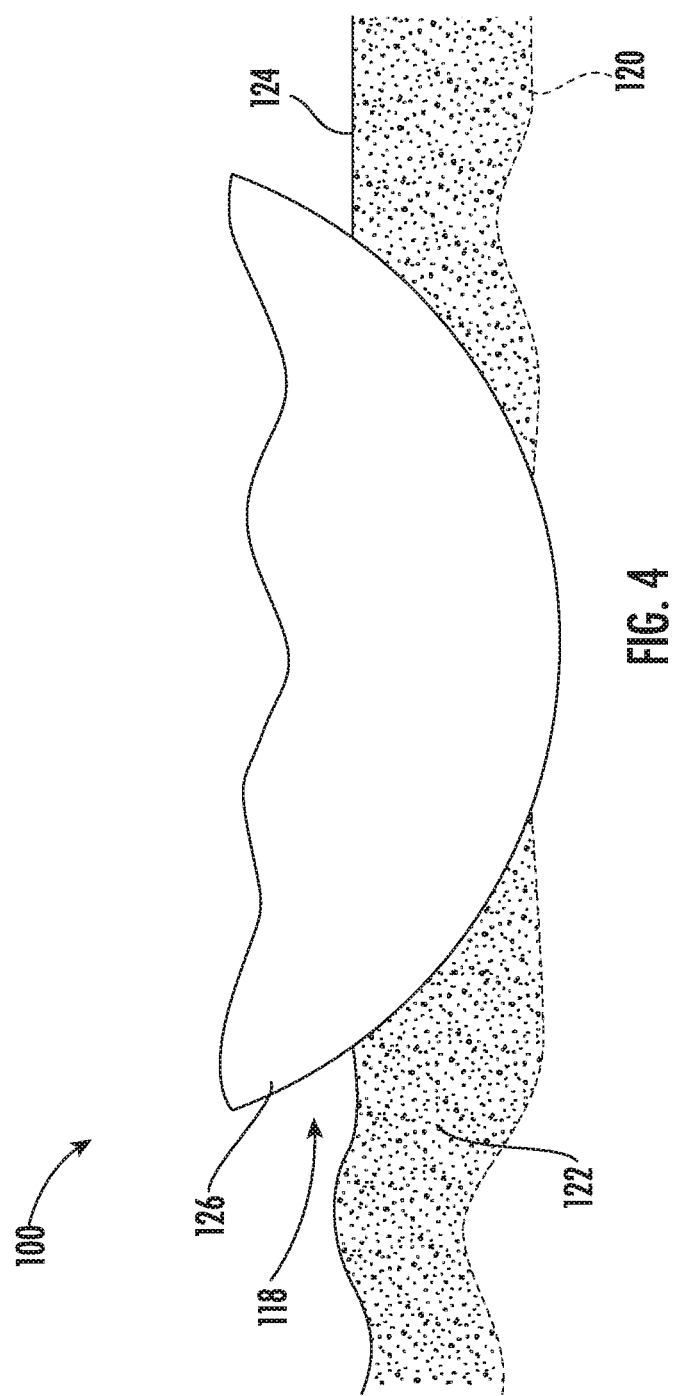
FIG. 4 illustrates a simplified view of a ground-engaging portion of the seedbed floor detection assembly shown in FIG. 3 positioned relative to a floor and an outer surface of a seedbed directly behind an implement following the performance of a field operation.

In addition, the detection assembly 100 may include a seedbed tool 118 coupled to the pivot arms 104, 106. In general, the seedbed tool 118 may be configured to ride along or otherwise contact a floor of a seedbed created by the implement 10 as the implement 10 is being moved through the field, thereby allowing the seedbed tool 118 to follow the contour or profile of the seedbed floor. For instance, as shown in FIG. 4, the seedbed tool 118 may ride along a floor 120 of a seedbed 122 (with the seedbed 122 extending vertically between an outer seedbed surface 124 and the seedbed floor 120) as the implement 10 (and, thus, the detection assembly 100) is moved in the forward travel direction 12. Thus, as the seedbed tool 118 is moved across a portion of the seedbed floor 120 that includes vertically-oriented variations in its profile (e.g., dips or raises in the seedbed floor 120), the seedbed tool 118 may raise or lower relative to the frame member 30 as the tool 118 follows the profile of the seedbed floor 120. Such raising or lowering of the seedbed tool 118 may, in turn, result in the pivot arms 104, 106 pivoting relative to the frame member 30. For instance, as the seedbed tool 118 rises with increases in the vertical profile of the seedbed floor 120, the pivot arms 104, 106 may pivot upwardly about the pivot point 108 in a first direction (e.g., as indicated by arrow 110 in FIG. 3). Similarly, as the seedbed tool 118 lowers with reductions in the vertical profile of the seedbed floor 120, the pivot arms 104, 106 may pivot downwardly about the pivot point 108 in an opposite, second direction (e.g., as indicated by arrow 112 in FIG. 3).

In general, the seedbed tool 118 may correspond to any suitable tool and/or member configured to penetrate through the loosened soil layer forming the seedbed 122 and ride along or otherwise contact the seedbed floor 120 as the implement 10 is moved across the field. In several embodiments, the seedbed tool 118 may correspond to one or more rotary members configured to rotate or roll along the seedbed floor 120. For instance, as shown in the illustrated embodiment, the seedbed tool 118 may correspond to a rotary disc 126 (e.g., a dulled coulter disc) configured to penetrate through the loosened soil of the seedbed 122 and roll along the seedbed floor 120. In such an embodiment, the rotary disc 126 may be coupled to the pivot arms 104, 106 via a suitable support bracket 128 and a mounting plate 129 or other suitable mounting means to allow the rotary disc 126 to be rotationally supported relative to the seedbed floor 120. In other embodiments, the seedbed tool 118 may correspond to one or more non-rotary tools, such as a sweep or a tine, configured to penetrate through the loosened soil of the seedbed 122 and contact the seedbed floor 120 as the implement 10 is moved across the field. Furthermore, although the illustrated embodiment of the detection assembly 100 includes a single seedbed tool 118, it should be appreciated that, in alternative embodiments, the detection assembly 100 may include two or more seedbed tools 118.

Referring again to FIG. 3, the detection assembly 100 may also include a seedbed floor sensor 130 configured to detect the vertical position of the seedbed tool 118 relative to the frame member 30 (e.g., by detecting the vertical position of or the vertical pivotable motion of the arms 104, 106). By detecting the vertical position of the pivot arms 104, 106 relative to the frame member 30, the sensor 130 may be configured to indirectly detect the vertical profile of the seedbed floor 120 as the pivot arms 104, 106 pivot vertically due to changes in the vertical positioning of the seedbed tool 118 as such tool 118 rides along the seedbed floor 120. Accordingly, the vertical position of the pivot arms 104, 106 relative to the frame member 30 may be used to determine the vertical profile of the seedbed floor 120.

It should be appreciated that the seedbed floor sensor 130 may generally correspond to any suitable sensor or sensing device configured to directly or indirectly detect the vertical position of the seedbed tool 118 relative to the frame member 30. In several embodiments, the seedbed floor sensor 130 may include a rotary sensor 132 (e.g., a rotary potentiometer or a magnetic rotary sensor) coupled to the bracket 102 (which is, in turn, coupled to the frame member 30) or one of the pivot arms 104, 106 and an associated sensor linkage 134 coupled between the rotary sensor 132 and the other adjacent component. For instance, as shown in the illustrated embodiment, the rotary sensor 132 is coupled to a portion of the bracket 102, with the sensor linkage 134 being coupled between the rotary sensor 132 and one of the pivot arms 104, 106. As such, the vertical position of the pivot arms 104, 106 relative to the frame member 30 may be detected by the rotary sensor 132 via the mechanical linkage provided by the sensor linkage 134.

In other embodiments, the seedbed floor sensor 130 may correspond to any other suitable sensor or sensing device configured to detect the position of the seedbed tool 118. For instance, the seedbed floor sensor 130 may correspond to a linear potentiometer, a proximity sensor, and/or any other suitable transducer (e.g., ultrasonic, electromagnetic, infrared, etc.) that allows the vertical position of the pivot arms 104, 106 to be directly or indirectly detected. Furthermore, although the illustrated embodiment of the detection assembly 100 includes a single seedbed floor sensor 130, it should be appreciated that, in alternative embodiments, the detection assembly 100 may include two or more seedbed floor sensors 130.

As shown in FIG. 3, the detection assembly 100 may also include a biasing mechanism 136 configured to bias the seedbed tool 118 in the direction of the seedbed floor 120. For instance, as shown in the illustrated embodiment, the biasing mechanism 136 corresponds to a spring-loaded device coupled between the bracket 102 and the first and second pivot arms 104, 106, respectively. As such, the spring-loaded device may bias the pivot arms 104, 106 away from the bracket 102 and the frame member 30, thereby forcing the seedbed tool 118 downwardly in the direction of the seedbed floor 120. However, in other embodiments, the biasing mechanism 136 may correspond to any other suitable device, such as a spring, a fluid-driven cylinder, or a suitable linear actuator. Furthermore, although the illustrated embodiment of the detection assembly 100 includes a biasing mechanism, it should be appreciated that, in alternative embodiments, the detection assembly 100 may include two or more biasing mechanisms 136.

In accordance with aspects of the present subject matter, the detection assembly 100 may include a seedbed floor detection assembly actuator 138 configured to adjust the position of the assembly 100 in the lateral direction 24 relative to the frame 16. More specifically, the mounting plate 129 may be slidably coupled to the pivot arm 104, 106 to permit the mounting plate 129, the support bracket 128, and the seedbed tool 118 to slide relative to the pivot arms 104, 106 in the lateral direction 24. As such, in one embodiment, a first end of the actuator 138 (e.g., a rod 140 of the actuator 138) may be coupled to mounting plate 129, while a second end of the actuator 136 (e.g., a cylinder 142 of each actuator 106) may be coupled to the frame member 30 (e.g., via brackets 144). The rod 140 may be configured to extend and/or retract relative to the cylinder 142 to adjust the lateral position of the seedbed tool 118 relative to the frame 16. For example, the rod 140 may extend relative to the cylinder 142 such that the seedbed tool 118 is moved in a first lateral direction (e.g., as indicated by arrow 114) relative to frame 16. Conversely, the rod 140 may retract relative to the cylinder 142 such that the seedbed tool 118 is moved in an opposite second lateral direction (e.g., as indicated by arrow 116) relative to frame 16. In this regard, the rod 140 may alternatingly extend and retract relative to the cylinder 142 to such that the seedbed tool 118 traverses a lateral swath of the seedbed floor 120 (e.g., the seedbed tool 118 is moved back and forth in the first and second directions 114, 116 across the lateral swath of the seedbed floor 120) as the implement 10 is moved in the direction of travel 12. Although the illustrated embodiment of the implement 10 includes a single actuator 136, it should be appreciated that, in alternative embodiments, the implement 10 may include any other suitable number of actuators 136. For example, in one alternative embodiment, a second actuator (not shown) may be coupled between the first pivot arm 104 and the frame member 30 in addition to (or as an alternative thereto) the actuator 136 coupled between the second pivot arm 106 and the frame member 30.

Moreover, it should be appreciated that the actuator 136 may correspond to any suitable device configured to adjust the position of the seedbed tool 118 relative the frame 16 in the lateral direction 24. For example, in one embodiment, the actuator 136 corresponds to a fluid-driven actuator, such as a hydraulic or pneumatic cylinder. However, it should be appreciated that the actuator 136 may correspond to any other suitable type of actuator, such as an electric linear actuator or a screw-type actuator.

In several embodiments, the detection assembly 100 may include a lateral position sensor 146 configured to detect the lateral position of the seedbed tool 118 relative to the frame member 30 (e.g., by detecting the extension and/or retraction of the rod 140 of the actuator 138 relative to the cylinder 142 of the actuator 138). By detecting the extension/retraction of the rod 140 relative to the cylinder 142, the sensor 146 may be configured to indirectly detect the position of the seedbed tool 118 relative to the frame member 30 in the lateral direction 24 as the seedbed tool 118 is moved in the lateral direction 24 by the actuator 136. Accordingly, the extension/retraction of the rod 140 relative the cylinder 142 may be used to determine the current lateral position of the seedbed tool 118 within the lateral swath of the seedbed floor being traversed by the tool 118.

It should be appreciated that the sensor 146 may generally correspond to any suitable sensor or sensing device configured to directly or indirectly detect the lateral position of the seedbed tool 118 relative to the frame member 30. For example, in several embodiments, the sensor 146 may correspond to a linear potentiometer integrated into or otherwise provided in operative association with the cylinder 142 such the potentiometer may detect the extension/retraction of the rod 140 relative to the cylinder 142. However, in alternative embodiments, the sensor 146 may correspond to any other suitable sensing device, such as rotary sensor and associated linkage, a proximity sensor, and/or any other suitable transducer (e.g., ultrasonic, electromagnetic, infrared, etc.) that allows the lateral position of the seedbed tool 118 to be directly or indirectly detected.

Figure 5:
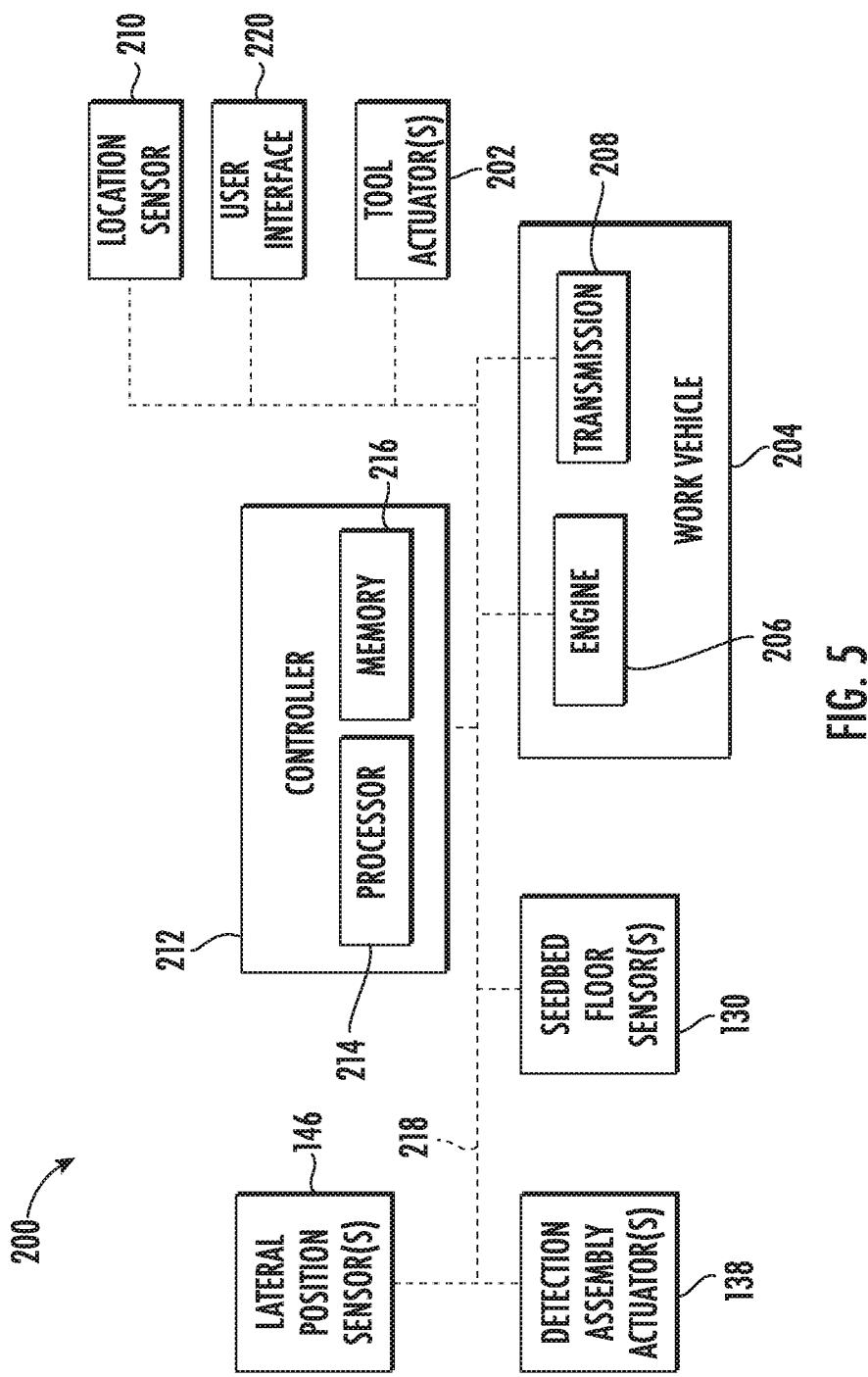
FIG. 5 illustrates a schematic view of one embodiment of a system for monitoring the condition of a seedbed within a field in accordance with aspects of the present subject matter.

Referring now to FIG. 5, a schematic view of one embodiment of a system 200 for monitoring the condition of seedbed within a field is illustrated in accordance with aspects of the present subject matter. In general, the system 200 will be described herein with reference to the implement 10 and the seedbed floor detection assembly 100 described above with reference to FIGS. 1-4. However, it should be appreciated by those of ordinary skill in the art that the disclosed system 200 may generally be utilized with implements having any other suitable implement configuration and/or seedbed floor detection assemblies having any suitable assembly configuration.

As shown in FIG. 5, the system 200 may include one or more tool actuators 202 of the implement 10. Specifically, each actuator 202 may be configured to adjust to the position or orientation of a ground-penetrating tool of implement 10, such as one of the gangs 42 of disc blades 44, relative to the implement frame 16. For example, in one embodiment, a first end of each actuator 202 (e.g., a rod of each actuator 202) may be coupled to the tool, while a second end of each actuator 202 (e.g., the cylinder of each actuator 202) may be coupled to the frame 16. The rod of each actuator 202 may be configured to extend and/or retract relative to the corresponding cylinder to adjust the position or orientation of the tool relative to the frame 16. In one embodiment, the actuator(s) 202 corresponds to a fluid-driven actuator(s), such as a hydraulic or pneumatic cylinder(s). However, it should be appreciated that the actuator(s) 202 may correspond to any other suitable type of actuator(s), such as an electric linear actuator(s).

Furthermore, the system 200 may include a work vehicle 204, such as a tractor or other agricultural work vehicle, that is configured tow the implement 10 across the field in the direction of travel 12. In this regard, the vehicle 204 may include one or more devices for adjusting the speed at which the implement 10 is moved across the field. For example, the vehicle 204 may include an engine 206 and a transmission 208. In general, the engine 206 may be configured to generate power by combusting or otherwise burning a mixture of air and fuel. The transmission 208 may, in turn, be operably coupled to the engine 206 and may provide variably adjusted gear ratios for transferring the power generated by the engine 206 to wheels (not shown) and/or track assemblies (not shown) of the vehicle 204. For example, increasing the power output by the engine 206 (e.g., by increasing the fuel flow to the engine 206) and/or shifting the transmission 208 into a higher gear may increase the speed at which the implement 10 is moved across the field. Conversely, decreasing the power output by the engine 206 (e.g., by decreasing the fuel flow to the engine 206) and/or shifting the transmission 208 into a lower gear may decrease the speed at which the implement 10 is moved across the field.

Additionally, as shown in FIG. 5, a location sensor 210 may be provided in operative association with the implement 10 and/or the vehicle 204. In general, the location sensor 210 may be configured to determine the exact location of the implement 10 and/or the vehicle 204 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 210 may be transmitted to a controller(s) of the implement 10 and/or the vehicle 204 (e.g., in the form coordinates) and stored within the controller's memory for subsequent processing and/or analysis. For instance, based on the known dimensional configuration and/or relative positioning between the seedbed tool(s) 118 and the location sensor 210, the determined location from the sensor 210 may be used to geo-locate the seedbed tool(s) 118 within the field.

In accordance with aspects of the present subject matter, the system 200 may include a controller 212 positioned on and/or within or otherwise associated with the implement 12 or vehicle 204. In general, the controller 212 may comprise any suitable processor-based device known in the art, such as a computing device or any suitable combination of computing devices. Thus, in several embodiments, the controller 212 may include one or more processor(s) 214 and associated memory device(s) 216 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 216 of the controller 212 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 216 may generally be configured to store suitable computer-readable instructions that, when implemented by the processor(s) 214, configure the controller 212 to perform various computer-implemented functions.

In addition, the controller 212 may also include various other suitable components, such as a communications circuit or module, a network interface, one or more input/output channels, a data/control bus and/or the like, to allow controller 212 to be communicatively coupled to any of the various other system components described herein (e.g., the seedbed floor sensor(s) 126, the detection assembly actuator(s) 138, the lateral position sensor(s) 146, the tool actuator(s) 202, the engine 206, the transmission 208, and/or the location sensor 210). For instance, as shown in FIG. 5, a communicative link or interface 218 (e.g., a data bus) may be provided between the controller 212 and the components 126, 138, 146, 202, 206, 208, 210 to allow the controller 212 to communicate with such components 126, 138, 146, 202, 206, 208, 210 via any suitable communications protocol (e.g., CANBUS).

It should be appreciated that the controller 212 may correspond to an existing controller(s) of the implement 10 and/or the vehicle 204, itself, or the controller 212 may correspond to a separate processing device. For instance, in one embodiment, the controller 212 may form all or part of a separate plug-in module that may be installed in association with the implement 10 and/or the vehicle 204 to allow for the disclosed systems to be implemented without requiring additional software to be uploaded onto existing control devices of the implement 10 and/or the vehicle 204. It should also be appreciated that the functions of the controller 212 may be performed by a single processor-based device or may be distributed across any number of processor-based devices, in which instance such devices may be considered to form part of the controller 212. For instance, the functions of the controller 212 may be distributed across multiple application-specific controllers, such as an engine controller, a transmission controller, a navigation controller, an implement controller, and/or the like.

Furthermore, in one embodiment, the system 200 may also include a user interface 220. More specifically, the user interface 220 may be configured to provide feedback (e.g., notifications associated with the conditions of the seedbed) to the operator of the implement 10 and/or vehicle 204. As such, the user interface 220 may include one or more feedback devices (not shown), such as display screens, speakers, warning lights, and/or the like, which are configured to provide feedback from the controller 212 to the operator. The user interface 220 may, in turn, be communicatively coupled to the controller 212 via the communicative link 218 to permit the feedback to be transmitted from the controller 212 to the user interface 220. In addition, some embodiments of the user interface 220 may include one or more input devices (not shown), such as touchscreens, keypads, touchpads, knobs, buttons, sliders, switches, mice, microphones, and/or the like, which are configured to receive user inputs from the operator. In one embodiment, the user interface 220 may be positioned within a cab (not shown) of the vehicle 204. However, in alternative embodiments, the user interface 220 may have any suitable configuration and/or be positioned in any other suitable location.

In several embodiments, the controller 212 may be configured to control the operation of one or more seedbed floor detection assembly actuators 138. More specifically, as indicated above, the implement 10 may include one or more seedbed detection assemblies 100 mounted on its frame 16. Each detection assembly 100 may, in turn, include an actuator 138 configured to adjust the position of a seedbed tool 118 of the assembly 100 in the lateral direction 24 relative to the implement frame 16. In this regard, the controller 212 may be configured to transmit instructions to the actuator(s) 138 (e.g., via the communicative link 218) instructing the actuator(s) 138 to adjust the position(s) of the seedbed tool(s) 118 in the lateral direction 24 relative to the frame 16 such that the tool(s) 118 traverses a lateral swath(s) of the seedbed floor as the implement 10 is moved across the field. For example, in one embodiment, the instructions may instruct the actuator(s) 138 to move the seedbed tool(s) 118 back and forth across the lateral swath(s) in the lateral direction 24.

It should be appreciated that, as the implement 10 is moved across the field, the seedbed tool(s) 118 may traverse the corresponding lateral swath(s) of the seedbed floor in any suitable manner. For example, the seedbed tool(s) 118 may be moved across the lateral swath(s) such that the path(s) generally defines a sinusoidal shape(s), a sawtooth shape(s), stair-step shape(s), and/or the like.

Furthermore, in several embodiments, the controller 212 may be configured to determine a profile(s) of one or more lateral swaths of the seedbed floor. More specifically, as the seedbed tool(s) 118 are moved across the across lateral swath(s) of the seedbed floor in the lateral direction 24, a seedbed floor sensor 130 of the each detection assembly 100 may be configured to detect the vertical position of the corresponding seedbed tool 118 relative to the frame 16 (e.g., by detecting the vertical position of the corresponding pivot arms 104, 106 relative to the frame 16). The vertical position of each seedbed tool 118 may, in turn, be indicative of the vertical profile of a corresponding lateral swath of the seedbed floor. In this regard, the controller 212 may be configured to receive data from seedbed floor sensor(s) 130 (e.g., via the communicative link 218). Thereafter, the controller 212 may be configured to analyze/process the received data to determine the vertical profile(s) of one or more lateral swaths of the seedbed floor. The vertical profile of each lateral swath of the seedbed floor may, in turn, be associated with the data received from one of the seedbed floor sensor(s) 130. For instance, the controller 212 may include a look-up table(s), suitable mathematical formula, and/or algorithms stored within its memory 216 that correlates the received data to the vertical seedbed floor profile of the lateral swath(s) of seedbed floor.

It should be appreciated that determining the vertical profile(s) across the lateral swath(s) of the seedbed floor may provide one or more technical advantages. For example, moving the seedbed tool(s) 118 in the lateral direction 24 relative to the frame 16 across the lateral swath(s) of the seedbed floor may permit the seedbed floor sensor(s) 130 capture data across a larger portion of the seedbed floor. As such, the determined vertical profile(s) provide an indication of the condition of a larger portion of the seedbed floor. Additionally, as will be described below, the determined vertical profile(s) may an indication of how the entire width/length of the ground-penetrating tools forming the seedbed interacts with the soil in the field.

Figure 6:
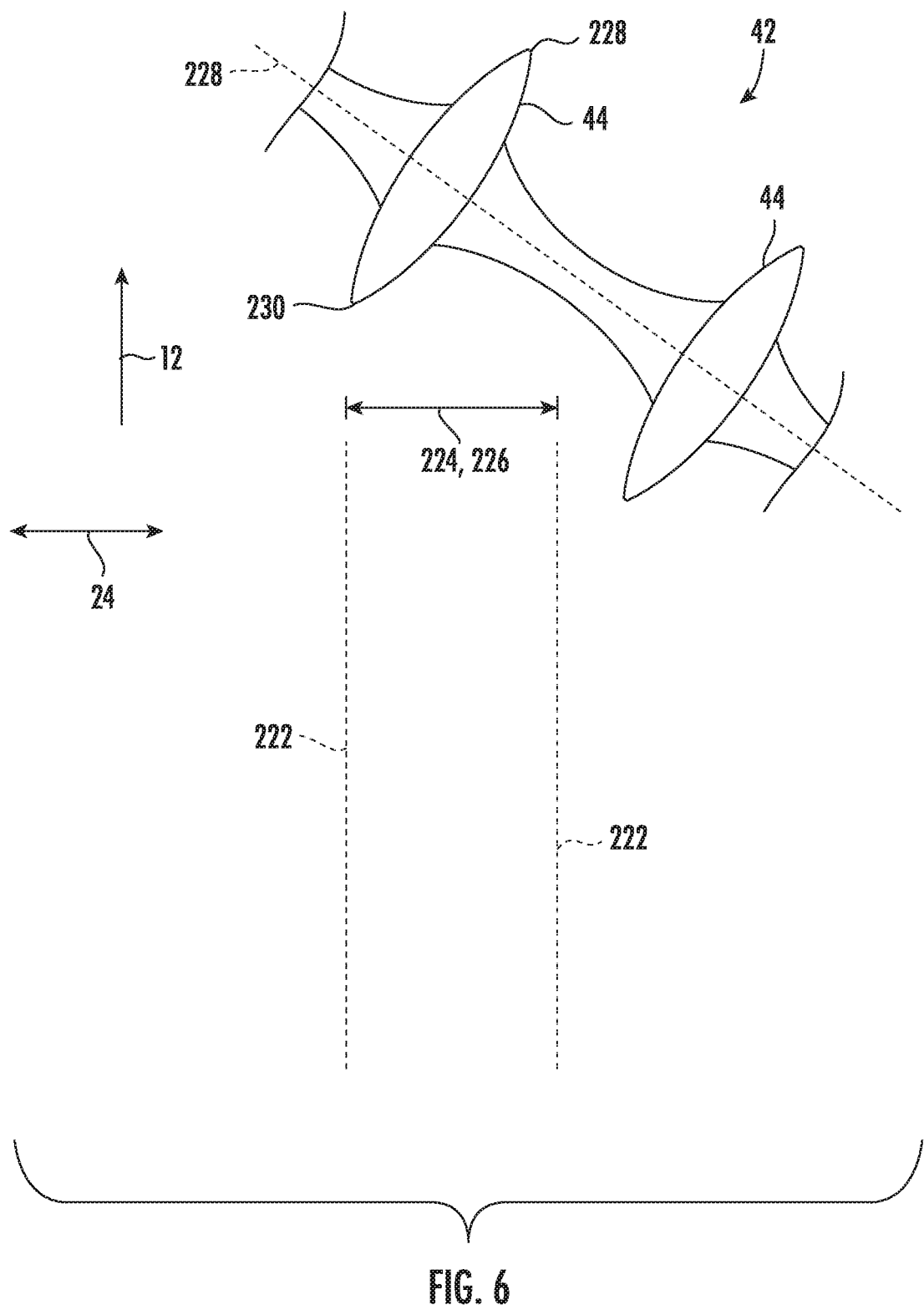
FIG. 6 illustrates an example lateral swath of a field across which a seedbed floor detection assembly of an agricultural implement is moved in accordance with aspects of the present subject matter.

Furthermore, it should be appreciated that the lateral swath(s) of the seedbed floor across which the vertical profile is determined may have any suitable width in the lateral direction 24. For example, FIG. 6 illustrates an example lateral swath (e.g., as indicated by dashed lines 222) of the seedbed floor having a lateral width (e.g., as indicated by arrow 224) that is generally the same as a lateral width (e.g., as indicated by arrow 226) of a disc blade 44. As indicated above, the gangs 42 of the disc blades 44 may be oriented at an angle relative to the direction of travel 12 such that an axial centerline (e.g., as indicated by dashed line 228 in FIG. 6) of each gang 42 of discs 44 is similarly oriented at an angle relative to the direction of travel 12. In this regard, the lateral width 224 of each disc blade 44 is defined between its leading edge 230 and its trailing edge 232. Furthermore, as shown, in one embodiment, the example lateral swath 222 may be aligned in the lateral direction 24 with one of the disc blades 44. As such, the determined vertical profile(s) of the lateral swath(s) may provide an indication of how the entirety of the aligned disc blade 44 forming the seedbed is interacting with the soil in the field.

Referring again to FIG. 5, the controller 212 may be configured to geo-locate the determined vertical profile(s) of the lateral swath(s) of seedbed floor within the field. More specifically, as the implement 10 is moved across the field, the controller 212 may be configured to receive location data (e.g., coordinates) from the location sensor 210 (e.g., via the communicative link 218). Based on the known dimensional configuration and/or relative positioning between the seedbed tool(s) 118 and the location sensor 210, the controller 212 may be configured to geo-locate each vertical profile measurement of the lateral swath(s) of the seedbed floor within the field. For example, the coordinates derived from the location sensor 210 and the vertical profile measurements derived from the seedbed floor sensor(s) 130 may both be time-stamped. As such, the time-stamped data may allow the seedbed floor profile measurements to be matched or correlated to a corresponding set of location coordinates received or derived from the location sensor 210.

In several embodiments, the controller 212 may be configured to generate a field map illustrating the vertical profile of the field being traversed by the implement 10 at various locations within the field. More specifically, as described above, the controller 212 may be configured to geo-locate each vertical profile measurement of the lateral swath(s) of the seedbed floor within the field. In one embodiment, the controller 212 may know the position of the profile measurements along the length of each lateral swath in the direction of travel 12 (e.g., based on the received location data), but not the position of the measurements in the lateral direction 24 of each lateral swath. In such embodiment, the controller 212 may associate each profile measurement with entire lateral width of the corresponding lateral swath at the position along the length of such lateral swath where the measurement was captured. Thereafter, the controller 212 may be configured to generate a field map (e.g., a graphical field map) illustrating the vertical profile(s) of the lateral swath(s) of the seedbed floor at various positions along the length of such swath(s). For instance, the controller 212 may be configured to execute one or more algorithms stored within its memory 216 that generate the field map based on the data received seedbed floor sensor(s) 130 and the location sensor 210. In one embodiment, the controller 212 may be configured to transmit instructions to the user interface 220 (e.g., the communicative link 218) instructing the user interface 220 to display a field map (e.g., a graphical field map) illustrating the vertical profile of the lateral swath(s) of the seedbed floor at various positions along the length of such swath(s).

Moreover, in one embodiment, the controller 212 may be configured to the generate field map illustrating the position of each profile measurement within the corresponding lateral swath in the lateral direction 24. More specifically, as described above, in some embodiments, each detection assembly 100 may include a lateral position sensor 146 configured to detect the lateral position of the corresponding seedbed tool 118 relative to the implement frame 16. In this regard, as the seedbed tool(s) 118 are moved across the across lateral swath(s) of the seedbed floor in the lateral direction 24, the lateral position sensor(s) 146 may be configured to detect the lateral position(s) of the seedbed tool(s) 118 relative to the frame 16 (e.g., by detecting the extension/retraction of the rod(s) 140 of the actuator(s) 138 relative to the cylinder(s) 142 of the actuator(s) 138). The lateral position of each seedbed tool 118 relative to the frame 16 may, in turn, be indicative of the lateral position of such seedbed tool 118 with the corresponding lateral swath of the seedbed floor. In this regard, the controller 212 may be configured to receive data from lateral position sensor(s) 146 (e.g., via the communicative link 218). Thereafter, the controller 212 may be configured to analyze/process the received data to determine the lateral position(s) of the seedbed tool(s) 118 within the lateral swath(s) of the seedbed floor. The lateral position(s) of the seedbed tool(s) may, in turn, be indicative of the lateral position(s) of the profile measurements within the lateral swath(s). Thereafter, the controller 212 may be configured to generate a field map (e.g., a graphical field map) illustrating the vertical profile(s) of the lateral swath(s) of the seedbed floor at various positions along the length and width of such swath(s). For instance, the controller 212 may be configured to execute one or more algorithms stored within its memory 216 that generate the field map based on the data received seedbed floor sensor(s) 130, the lateral position sensor(s) 146, and the location sensor 210.

In accordance with aspects of the present subject matter, the controller 212 may be configured to initiate one or more control actions when variations in the determined seedbed floor profile(s) exceed a predetermined threshold. In general, such variations in the seedbed floor profile(s) may be indicative of an undulating or non-uniform seedbed. As such, the controller 212 may be configured to compare the variations in each determined seedbed floor profile to the predetermined threshold. When the variations exceed the predetermined threshold, the controller 212 may be configured to initiate one or more control actions to address the differential to address the variations in the seedbed floor profile(s).

It should be appreciated that the predetermined threshold to which the controller 212 compare the determined seedbed floor profile(s) may be selected to prevent the controller 212 from initiating control action(s) when only minor variations exist in the seedbed floor profile(s). In general, the seedbed floor profile(s) may experience minor variations throughout the field. For example, soil condition changes, rocks, field trash, and/or the like may cause minor variations in the determined seedbed floor profile(s). Such minor variations may be expected and are generally not indicative of poor seedbed quality or the need to adjust an operating parameter(s) of the implement 10 and/or the vehicle 204. As such, the predetermined threshold may be a value associated with variations in the profile(s) that is great enough to be indicative of poor seedbed quality or the need to adjust an operating parameter(s) of the implement 10 and/or the vehicle 204.

In several embodiments, when the variations in the determined seedbed floor profile(s) exceed the predetermined threshold, the controller 212 may be configured to notify the operator of implement/vehicle 10/204 that the variations have exceeded the predetermined threshold. Specifically, in one embodiment, the controller 212 may be configured to transmit instructions to the user interface 220 (e.g., the communicative link 218) instructing the user interface 220 to provide a notification to the operator of the implement/vehicle 10/204 (e.g., by causing a visual or audible notification or indicator to be presented to the operator) indicating that the variations in the seedbed floor profile(s) have exceeded the predetermined threshold. In such instances, the operator may then choose to initiate any suitable corrective action he/she believes is necessary, such as adjusting one or more operating parameters of the implement 10 and/or the associated vehicle 204.

Moreover, in several embodiments, the controller 212 may be configured to automatically adjust one or more operating parameters of the implement 10 and/or the vehicle 204 when the variations in the determined seedbed floor profile(s) exceeds the predetermined threshold. Specifically, in one embodiment, the controller 212 may be configured to initiate adjustment of the penetration depth(s) of and/or down pressure being applied to the ground-penetrating tools (e.g., the disc blades 44) of the implement 10. For example, the controller 212 may be configured transmit instructions to the tool actuator(s) 202 (e.g., via the communicative link 218) instructing the actuator(s) 202 to adjust the penetration depth(s) of and/or down pressure being applied to the associated tool(s).

Furthermore, in one embodiment, the controller 212 may be configured to automatically adjust the ground speed at which the implement 10 is being moved across the field when the variations in the determined seedbed floor profile(s) exceed the predetermined threshold. Specifically, the controller 212 may be configured to transmit instructions to the engine 206 and/or the transmission 208 of the work vehicle 204 (e.g., via the communicative link 218) instructing the engine 206 and/or the transmission 208 to adjust their operation. For example, the controller 212 may instruct the engine 206 to vary its power output and/or the transmission 208 to upshift or downshift to increase or decrease the ground speed of the vehicle 204 and the implement 10 in a manner that reduces or minimizes the variations in the determined seedbed floor profile(s). However, it should be appreciated that, in alternative embodiments, the controller 212 may be configured to transmit instructions to any other suitable components (e.g., braking actuators) of the vehicle 204 and/or the implement 10 such that the ground speed of the vehicle 204 and/or the implement 10 is adjusted.

Figure 7:
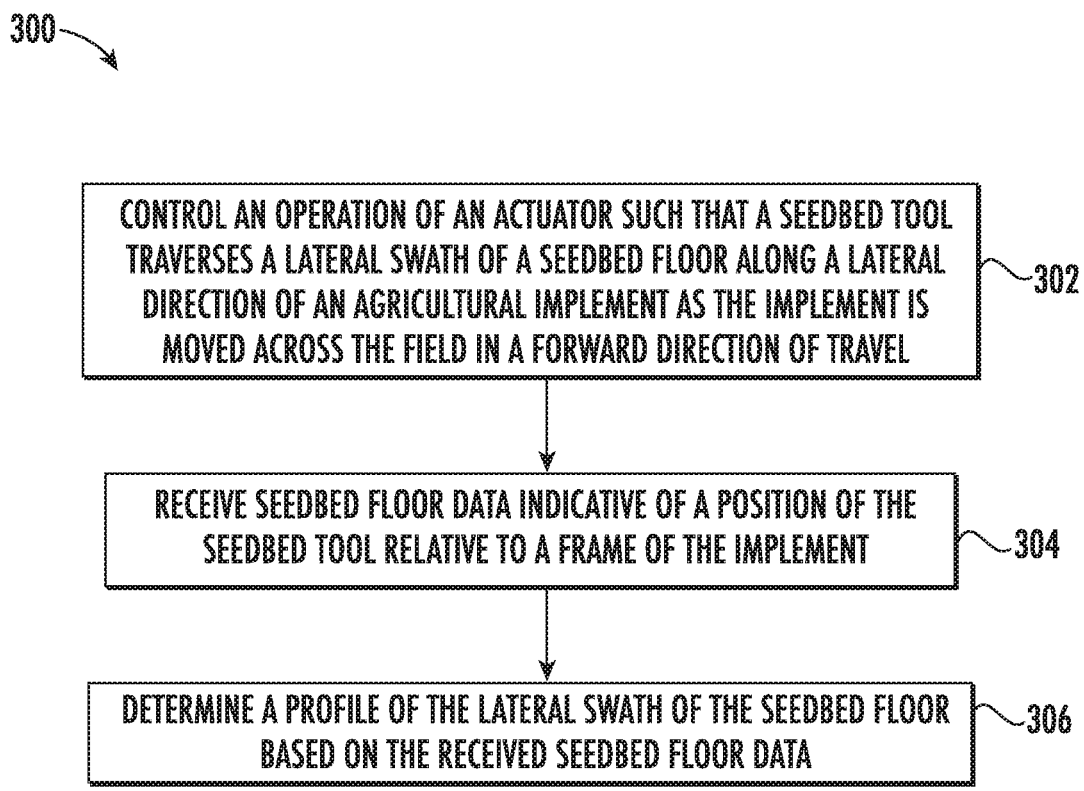
FIG. 7 illustrates a flow diagram of one embodiment of a method for monitoring the condition of a seedbed within a field in accordance with aspects of the present subject matter.

Referring now to FIG. 7, a flow diagram of one embodiment of a method 300 for monitoring the condition of a seedbed within a field is illustrated in accordance with aspects of the present subject matter. In general, the method 300 will be described herein with reference to the implement 10, the seedbed floor detection assembly 100, and the system 200 described above with reference to FIGS. 1-6. However, it should be appreciated by those of ordinary skill in the art that the disclosed method 300 may generally be implemented with any implement having any suitable implement configuration, any seedbed floor detection assembly having any suitable assembly configuration, and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include controlling, with a computing device, an operation of an actuator such that a seedbed tool traverses a lateral swath of a seedbed floor along a lateral direction of an agricultural implement as the implement is moved across the field in a forward direction of travel. For instance, as described above, the controller 212 may be configured to control the operation of one or more seedbed tool detection assembly actuators 138 such that a seedbed tool(s) 118 traverses a lateral swath(s) of a seedbed floor along a lateral direction 24 of the implement 10 as the implement 10 is moved across the field in a forward direction of travel 12.

Additionally, at (304), the method 300 may include receiving, with the computing device, seedbed floor data indicative of a position of the seedbed tool relative to a frame of the implement. For instance, as described above, the controller 212 may be configured to receive seedbed floor data indicative of a vertical position(s) of the seedbed tool(s) 118 relative to a frame 16 of the implement 10 from one or more seedbed floor sensors 130.

Moreover, as shown in FIG. 7, at (306), the method 300 may include determining, with the computing device, a profile of the lateral swath of the seedbed floor based on the received seedbed floor data. For instance, as described above, the controller 212 may be configured to determine a profile(s) of one or more lateral swaths of the seedbed floor based on the received seedbed floor data.

It is to be understood that the steps of the method 300 are performed by the controller 212 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 212 described herein, such as the method 300, is implemented in software code or instructions which are tangibly stored on a tangible computer readable medium. The controller 212 loads the software code or instructions via a direct interface with the computer readable medium or via a wired and/or wireless network. Upon loading and executing such software code or instructions by the controller 212, the controller 212 may perform any of the functionality of the controller 212 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring the condition of a seedbed within a field, the system comprising:
an implement frame extending along a lateral direction between a first side and a second side;
a rotary disc configured to roll along a seedbed floor as the implement frame is moved across the field in a forward travel direction of the implement frame, the seedbed extending downwardly within the field from an outer seedbed surface to the seedbed floor;
an actuator configured to adjust a position of the rotary disc along the lateral direction relative to the implement frame as the implement frame is moved across the field in the forward direction of travel such that the rotary disc traverses a lateral swath of the seedbed floor along the lateral direction;
a seedbed floor sensor configured to detect a vertical position of the rotary disc relative to the implement frame; and
a controller communicatively coupled to the seedbed floor sensor, wherein the controller:
receives data from the seedbed floor sensor indicative of the vertical position of the rotary disc relative to the implement frame; and
determines a vertical profile of the lateral swath of the seedbed floor based on the received data as the rotary disc rolls along the seedbed floor with movement of the implement frame in the forward travel direction.

2. The system of claim 1, wherein the controller is configured to control the operation of the actuator such that the rotary disc traverses the lateral swath of the seedbed floor along the lateral direction as the implement frame is moved across the field in the forward direction of travel.

3. The system of claim 1, further comprising:
a location sensor configured to detect a parameter indicative of a location of the rotary disc within the field, the controller communicatively coupled to the location sensor, the controller is configured to generate a field map of the vertical profile of the lateral swath of the field being traversed by the rotary disc based on the determined vertical profile and the location sensor.

4. The system of claim 3, further comprising:
a lateral position sensor configured to detect a parameter indicative of a lateral position of the rotary disc, the controller communicatively coupled to the lateral position sensor, the controller further configured to generate the field map of the vertical profile of the lateral swath of the field based on data from the lateral position sensor and the location sensor in addition to the determined vertical profile, the field map correlating the of the vertical profile of the seedbed to the lateral position of the rotary disc within of the lateral swath of the field.

5. The system of claim 1, wherein the controller is configured to compare variations in the vertical profile of the lateral swath of the seedbed floor to a predetermined threshold.

6. The system of claim 5, wherein, when the variations in the vertical profile of the lateral swath of the seedbed floor exceed the predetermined threshold, the controller is configured to initiate a control action to address the variations in the lateral swath of the vertical profile of the seedbed floor.

7. The system of claim 6, wherein the control action comprises at least one of adjusting at least one of a ground speed of the implement frame, a down pressure applied through a ground-engaging tool supported on the implement frame, or a penetration depth of the ground-engaging tool.

8. The system of claim 7, wherein the control action comprises providing a notification to an operator of a work vehicle pulling the implement frame across the field.

9. The system of claim 1, further comprising:
a disc blade supported on the implement frame, the disc blade defining a width extending along the lateral direction between a forward edge of the disc blade and a rear edge of the disc blade, wherein a width of the lateral swath of the field along the lateral direction is equal to or greater than the width of the disc blade.

10. The system of claim 1, wherein the actuator comprises a fluid-driven cylinder.

11. An agricultural implement, comprising:
a frame extending along a lateral direction between a first side and a second side;
a rotary disc configured to roll along a seedbed floor as the agricultural implement is moved across a field in a forward travel direction of the agricultural implement, the seedbed extending downwardly within the field from an outer seedbed surface to the seedbed floor;
an actuator configured to adjust a position of the rotary disc along the lateral direction relative to the frame as the agricultural implement is moved across the field in the forward direction of travel such that the rotary disc traverses a lateral swath of the seedbed floor along the lateral direction;
a seedbed floor sensor configured to detect a vertical position of the rotary disc relative to the frame; and
a controller communicatively coupled to the seedbed floor sensor, wherein the controller:
receives data from the seedbed floor sensor indicative of the vertical position of the rotary disc relative to the frame; and
determines a vertical profile of the lateral swath of the seedbed floor based on the received data as the rotary disc rolls along the seedbed floor with movement of the implement frame in the forward travel direction.

12. The agricultural implement of claim 11, further comprising:
a disc blade supported on the frame, the disc blade defining a width extending along the lateral direction between a forward edge of the disc blade and a rear edge of the disc blade, wherein a width of the lateral swath of the field along the lateral direction is equal to or greater than the width of the disc blade.

13. The agricultural implement of claim 11, wherein the actuator comprises a fluid-driven cylinder.

14. A method for monitoring the condition of a seedbed within a field being traversed by an agricultural implement, the agricultural implement including a frame and a rotary disc configured to roll along a seedbed floor as the agricultural implement is moved across the field in a forward travel direction, the method comprising:
controlling, with a computing device, an operation of an actuator such that the rotary disc traverses a lateral swath of the seedbed floor along a lateral direction of the agricultural implement as the agricultural implement is moved across the field in the forward direction of travel;
receiving, with the computing device, seedbed floor data indicative of a vertical position of the rotary disc relative to the frame, the vertical position of the rotary disc being indicative of a vertical profile of the lateral swath of the seedbed floor; and
determining, with the computing device, the vertical profile of the lateral swath of the seedbed floor based on the received seedbed floor data.

15. The method of claim 14, further comprising:
when variations in the vertical profile of the lateral swath of the seedbed floor exceed a predetermined threshold, initiating, with the computing device, a control action to address the variations in the vertical profile of the lateral swath of the seedbed floor.

16. The method of claim 14, further comprising:
receiving, with the computing device, location data indicative of a location of the agricultural implement within the field; and
generating, with the computing device, a field map of the vertical profile of the lateral swath of the field being traversed by the rotary disc based on the received location data and the determined vertical profile.

17. The method of claim 16, further comprising:
receiving, with the computing device, lateral position data indicative of a lateral position of the rotary disc; and
generating, with the computing device, a field map of the vertical profile of the lateral swath of the field being traversed by the rotary disc based on the received lateral position data and the received location data in addition to the determined vertical profile.

18. The method of claim 14, wherein the control action comprises at least one of adjusting at least one of a ground speed of the agricultural implement, a down pressure applied through a ground-engaging tool supported on the frame, or a penetration depth of the ground-engaging tool.

19. The method of claim 14, wherein the control action is comprises providing a notification to an operator of a work vehicle pulling the agricultural implement frame across the field.

* * * * *